May 7, 1946.　　　H. W. ALDEN ET AL　　　2,399,654
BRAKE MECHANISM
Filed Nov. 13, 1942　　　3 Sheets-Sheet 1

Inventors
Herbert W. Alden
Lawrence R. Buckendale
Ralph K. Super
By Strauch & Hoffman
Attorneys

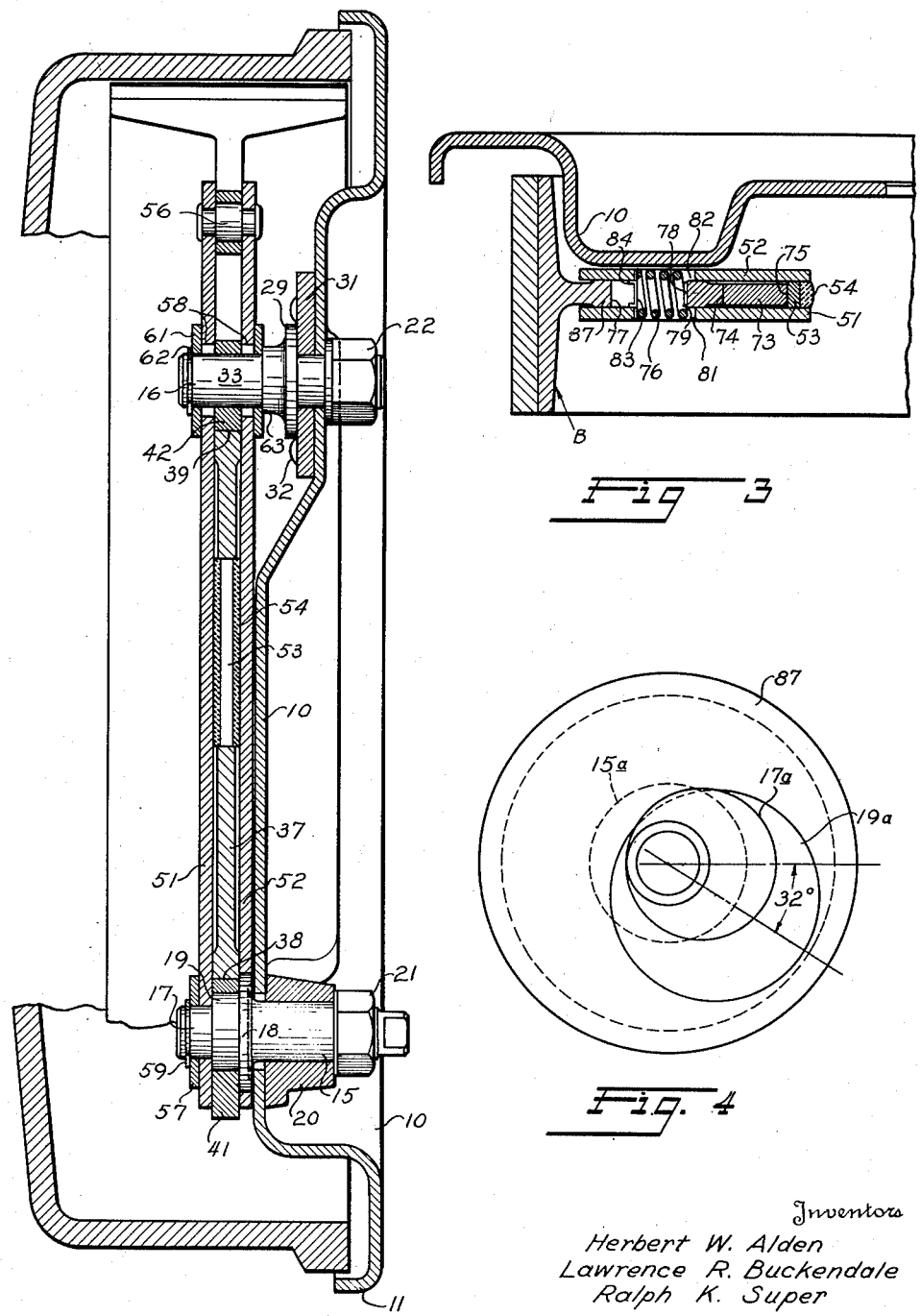

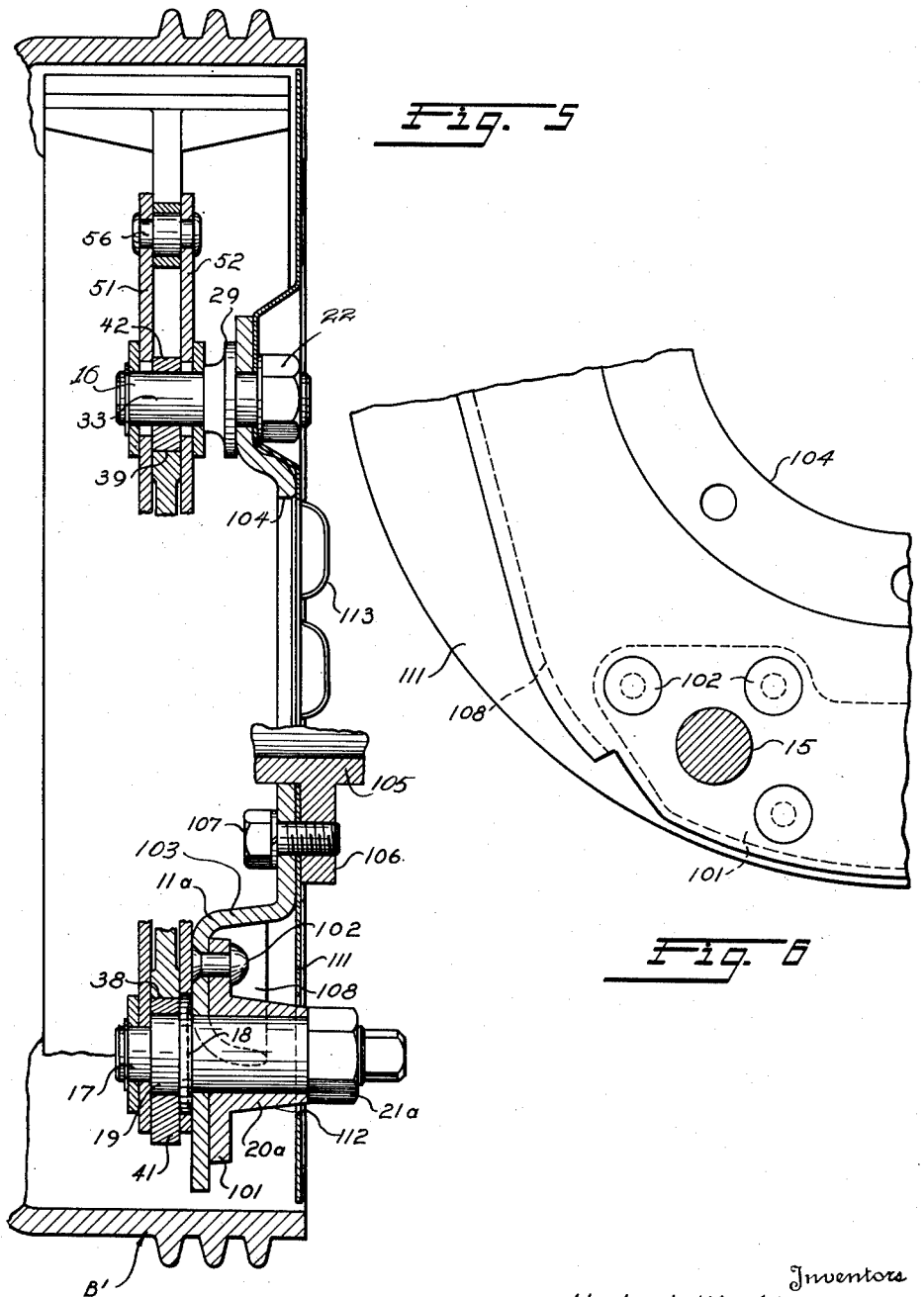

Patented May 7, 1946

2,399,654

UNITED STATES PATENT OFFICE 2,399,654

BRAKE MECHANISM

Herbert W. Alden, Lawrence R. Buckendale, and Ralph K. Super, Detroit, Mich., assignors to The Timken-Detroit Axle Company, Detroit, Mich., a corporation of Ohio Application November 13, 1942, Serial No. 465,490

26 Claims. (Cl. 188—78)

The present invention relates to brake mechanisms, and more particularly to internal expanding brakes for automotive vehicles, although it is not limited to such use.

In our United States Letters Patent No. 2,337,070 issued December 21, 1943, of which the present is a continuation-in-part, there is disclosed a brake mechanism embodying a pair of floating shoes which coact with pivoted abutments, and are advanced toward the drum by a pair of actuating levers in such manner that both shoes function as "leading" shoes in both directions of drum rotation, and a multiple spring arrangement, embodying a spring connected to the bottom of the shoes and a second spring connected by links to the upper ends of both the shoes and the levers, is employed to retract the shoes from the drum.

We have found that by providing a single compression spring in the brake shoe web and levers, and locating it so as to urge the brake shoe and levers into clamping relationship with the lever and shoe fulcruming means, and so locating the spring as to act substantially in alignment with the latter, it is possible to successfully employ a single retracting spring at the upper ends of the levers and yet achieve a superior performing mechanism.

It is accordingly the primary object of this invention to simplify and improve the retracting spring assembly disclosed in the aforementioned co-pending application and provide a brake mechanism having a novel spring assembly which will insure prompt retraction of the shoes upon release of the brake, and will not set up any tendency for the shoes to tilt when they are advanced toward, or retracted from, the brake drum.

A further important object is to provide a brake mechanism of the type in which the shoes are mounted for floating movement toward and away from the drum between a pair of abutments, with a novel lever and retracting spring assembly which will apply the braking forces to the middle of the shoe, will allow the shoe to freely rock into full surface engagement with the drum, will maintain fulcruming engagement between the lever and shoe at all times, and will effect prompt retraction of the brake shoe upon return of the lever.

Another object is to provide a brake mechanism embodying a floating shoe, with a novel actuating lever and spring assembly which will advance the shoe toward the drum, efficiently retract the shoe upon release of the brake, and yet will permit the shoe to be freely adjusted relatively to the lever, for the purpose of compensating for brake lining wear.

A further object is to provide a brake shoe and lever assembly, which are fulcrumed upon each other intermediate their ends, with a spring assembly which acts upon the brake shoe and reacts against the lever in radial alignment with the fulcrum axis, so as to retain the parts in assembled relationship and which also tends to return the lever and shoe to a predetermined relative angular relationship.

In heavy duty brakes which are subject to high temperatures, there is a tendency to boil the fluid out of the hydraulic cylinder as well as to melt or destroy the resilient characteristics of the rubber seals in the cylinder. Further, because of the high heat characteristics of the heavy duty brake there is a tendency for the piston, which is made of aluminum and has a much greater coefficient of expansion than the cast iron cylinder, to seize and prevent return of the brake shoe upon release of the brake pedal. We have found that by mounting the parts of the brake upon an open spider-like support, and by providing a removable dust shield which allows free air circulation around the parts, an adequate cooling of the brake may be achieved under normal heavy duty operations. If particularly severe conditions are encountered, it is desirable that the dust shield be removed altogether, thereby augmenting the flow of cooling air currents around and adjacent to the hydraulic cylinder and other brake parts.

It is accordingly a further object of the invention to provide a brake mechanism of the type in which the shoes are mounted for floating movement toward and away from the drums between a pair of pivoted abutments, with a novel foundation assembly capable of supporting all of the parts of the brake in such manner that improved cooling of all of the parts may be achieved and yet they will be protected against the entrance of dirt.

Another object is to provide a brake foundation assembly which may be opened up by removing parts thereof to provide augmented air flow over and around the parts.

Further objects will appear as the specification proceeds in conjunction with the annexed drawings, and from the appended claims.

In the drawings:

Figure 2 is a vertical sectional view taken substantially on the line 2—2 of Figure 1;

Figure 3 is a fragmental sectional view taken on the line 3—3 of Figure 1;

Figure 4 is an end elevation of a modified form of adjusting eccentric that may be employed in lieu of the one shown in Figures 1 and 2;

Figures 1, 1A:
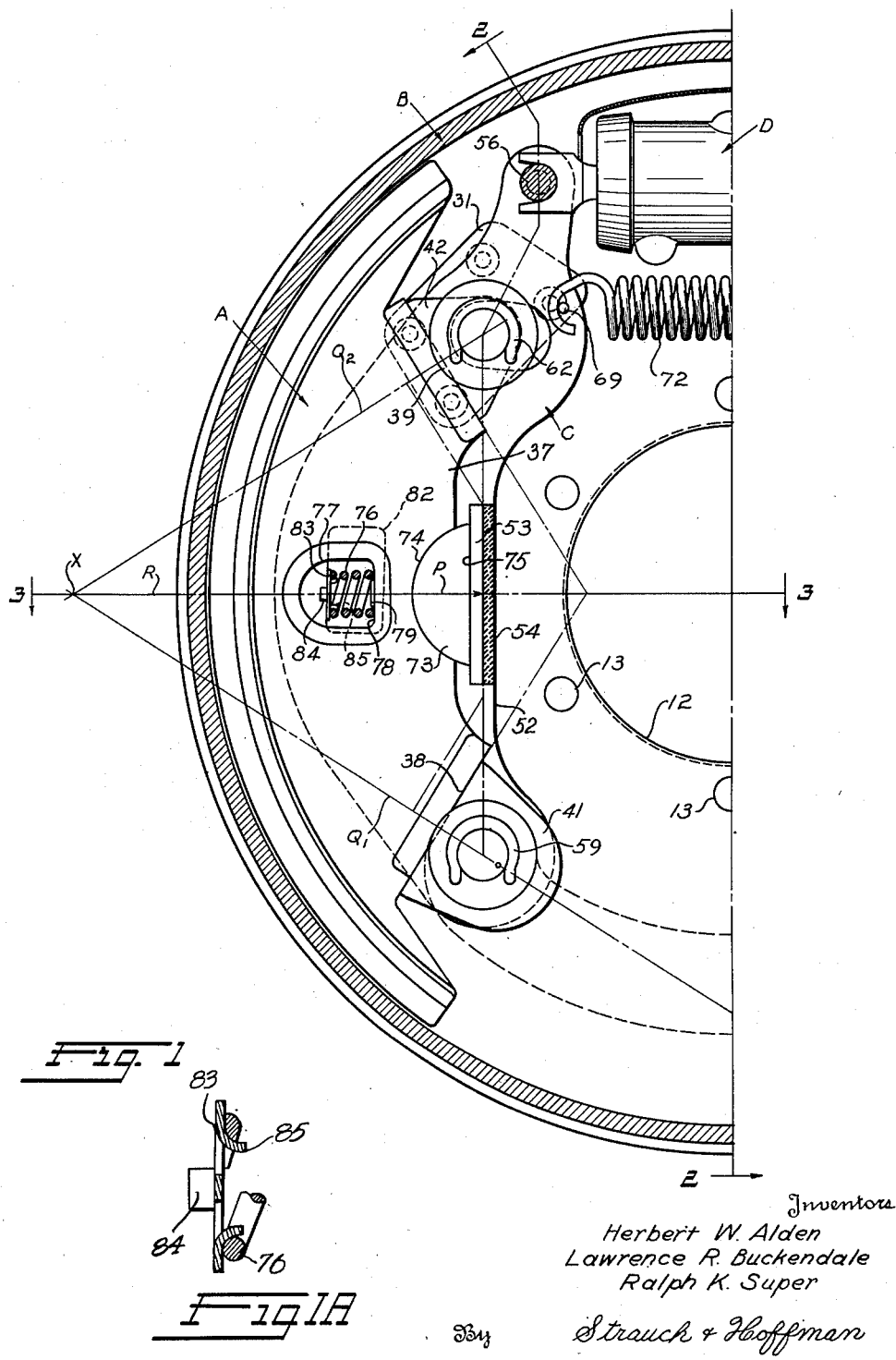
Figure 1 is a fragmental vertical sectional view adjacent the shoe web of a brake mechanism embodying the invention with the outside half of one of the actuating levers removed to more clearly illustrate the structure.
Figure 1A is a sectional view on an enlarged scale of the spring centering device of Figure 1.

Figure 5 is a view somewhat similar to Figure 2, but illustrates the brake mechanism mounted upon a modified form of foundation assembly, forming part of the invention; and, Figure 6 is a fragmental view showing the structure of Figure 5 as it appears when viewed from the left-hand side of that figure, with the brake shoe and lever assembly removed from the lower anchor pin, to more clearly show the foundation and shield.

With continued reference to the drawings, wherein similar reference characters have been employed to designate like parts throughout the several views thereof, the brake mechanism broadly comprises a pair of brake shoes A mounted for movement toward and away from a brake drum B, each brake shoe being actuated by a lever C. Levers C in turn are actuated by any suitable form of mechanism, such as a hydraulic or pneumatic piston and cylinder assembly D, or by a cam or the like.

In the form of invention shown in Figures 1 to 3 all of the working parts of the brake are carried by a backing or foundation plate 10, which is provided with a peripheral dirt-excluding lip 11, and a central opening 12. The foundation plate is adapted to be mounted over an axle in well known manner, with the margin of the plate adjacent opening 12 abutting a flange on the axle and secured thereto by screws or rivets passing through openings 13 in the plate.

Since the mechanism is exactly symmetrical, and the other brake shoe and lever assemblies are identically the same, only one of them has been shown in order to simplify the disclosure.

Rigidly secured to backing plate 10 is a pair of anchor pins 15 and 16. Pin 15 is provided with a pair of concentric journal portions 17 and 18, and an intermediate eccentric portion 19. Portion 18 is formed as a flange and is pulled into tight engagement with plate 10 by means of a nut 21 bearing against a reinforcing boss or collar 20 secured to the rear face of the backing plate. If desired, flange 18 may be provided with serrations matching with similar serrations on plate 10, so that when the parts are pulled into tight engagement, the pin is positively locked against rotation. Pin 15 is also provided with a square end, so that by loosening nut 21, the pin may be engaged by a wrench and turned to rotate the eccentric, and thereby adjust the brake in a manner to be hereinafter pointed out.

Upper pin 16 is provided with a shoulder 29, pulled into tight engagement with a reinforcing plate 31, by a nut 22. The plate is secured to backing plate 10 by means of rivets 32.

Anchor pins 15 and 16 constitute the sole support for the shoe and actuating lever assembly, and by locating the anchor pins in substantial vertical alignment, substantially equally spaced from a horizontal center line containing the axis of drum rotation, as shown in Figure 1; inclining the abutment faces on the ends of the shoes so as to intersect closely adjacent the horizontal center line; and applying the braking forces at the mid-portion of the shoe by a device having a rocking axis located closely adjacent the vertical center line of the anchor pins, a brake mechanism is provided which possesses substantially identical braking characteristics for both directions of drum rotation, and in which both shoes function as leading shoes that manifest a definite controllable degree of self-energization, and the pressure on the shoes is so distributed as to effect equal wear of the lining at both ends of the shoe.

The brake shoes may be provided with any suitable lining material in conventional manner, and each shoe has a central web or flange 37 provided at its opposite ends with abutment faces 38 and 39, which cooperate with link or abutment members 41 and 42, respectively. The latter directly absorb the braking torque reaction of the drum in both directions of rotation. Abutment member 41 is pivoted upon eccentric portion 19 of anchor pin 15, so that by rotating the anchor pin, as will be hereinafter described, the abutment member may be displaced so as to advance the lower end of the shoe with respect to the drum and take up the clearance caused by lining wear. The upper abutment member 42 is pivoted upon journal portion 33 of anchor pin 16.

We have found that by actuating the shoe with a pair of actuating levers fulcrumed upon the lower anchor pins; providing a single compression spring in the brake shoe web and lever assembly positioned to urge the brake shoe and levers into clamping relationship with a force transmitting device intermediate the ends of the shoe, and locating it so as to act substantially in alignment with the force transmitting means, it is possible to successfully employ a single retracting spring at the upper ends of the levers and yet achieve a superior performing mechanism. The novel lever shoe and spring assembly of the invention will now be described.

A pair of lever plates 51 and 52, of substantially identical shape, (lever 51 has been removed in Figure 1), are secured together in spaced parallel relationship by means of a block or lever saddle bar 53, rigidly secured in place between the plates by means of a weld 54, and by a shouldered stud 56 riveted to the upper ends of the levers. Lever plates 51 and 52 are journalled upon the concentric portions 17 and 18 of anchor pin 15. The lever assembly is detachably secured in place on the lower anchor pin by means of a washer 57 and a horse-shoe type retainer 59, which is sprung into a groove in the anchor pin.

Each lever, adjacent its upper end, is provided with an enlarged opening 58 for clearing anchor pin 16 in all adjusted positions of the levers. The upper end of the lever assembly is maintained in cooperative relationship with the anchor pin by means of a washer 61 and a spring retainer 62 sprung into a groove in anchor pin 16. The upper end of the lever assembly is accordingly freely rockable in a plane normal to the upper anchor pin, but is stabilized or restrained against movement axially of the pin. As seen in Figure 2, a shoulder 63 on the pin restrains the lever assembly against movement to the right, and the ring assembly just described prevents movement of the lever assembly in the opposite direction.

Secured between each pair of lever plates is a pin 69, to which the ends of a tension spring 72 are hooked. Spring 72 constantly urges the upper ends of the levers inwardly against the action of the piston and cylinder assembly D, and which, when the pressure is released, retracts brake shoes from the drum in a manner to be hereinafter pointed out.

The brake shoe actuating lever assembly just described may be operated by hydraulic, pneumatic, or mechanical means of any desired character, it only being necessary to spread the upper ends of the levers to actuate the brake.

Brake actuating forces are transmitted from each actuating lever to the associated brake shoe by means of a woodruff key-like element 73 confined between each pair of lever plates and coacting with a large area curved surface 74 in the brake shoe web and having a flat face coacting with the flat inner face 75 of block 53. Element 73 provides a fulcrum having an axis lying substantially on a vertical center line containing the axes of the two anchor pins, as indicated in Figure 1, and having a freely sliding connection with the lever assembly.

By incorporating a compression spring 76 in the brake shoe web, and locating it so as to act substantially in line with the fulcruming axis of the force transmitting element 73, we have found that the single retracting spring effectively retracts both shoes under all conditions of operation and brake shoe adjustment.

Spring 76 may be assembled with each lever C in any suitable manner, so that it will constantly urge the lever and shoe assembly together, so as to clamp member 73 between them and to also act along a line containing the fulcruming axis of member 73, but we preferably locate spring 76 in an opening 77 in the brake shoe web. Opening 77 has a face 78 against which the spring acts. Associated with face 78 is a low boss 79, which seats inside the spring and centers it.

Spring 76 projects into aligned openings 81 and 82 in lever plates 51 and 52, respectively, and, as seen in Figures 1 and 3, reacts against a plate 83, which bears against the opposite wall of openings 81 and 82. Plate 83, as illustrated in Figure 1A is provided with tongues 84 which seat between the lever plates and prevent lateral displacement of plate 83. Plate 83 is also provided with a pair of centering fingers 85 which engage inside of spring 76 and maintain it in assembled relationship with the plate.

As seen in Figure 1, openings 81 and 82 have a greater vertical dimension than the diameter of spring 76, with the result that the lever and brake shoe may be displaced relatively circumferentially of the drum without interference from the spring, plate 83 functioning as a bridge and freely sliding upon the walls of openings 81 and 82 in the lever plates into a new position when the brake is adjusted.

From the foregoing description it is apparent that spring 76 constantly urges the lever and shoe assembly into clamping relationship with fulcrum member 73, holding it under compression along a line passing through the axis of member 73, with the result that there is no tendency of the spring to rock the shoe one way or the other upon the lever.

Taking up the operation of the structure so far described, and assuming that the drum is rotating counterclockwise, (Figure 1) and hydraulic or pneumatic pressure is applied to cylinder D, the link engaging pin 56 rocks the lever assembly shown counterclockwise about the axis of anchor pin 15, against the action of spring 72. This action, through fulcrum member 73, forces the brake shoe outwardly toward the drum. As soon as contact of the shoe is made with the drum, the shoe rocks slightly into the proper position to bring it into full surface engagement with the drum, and compression spring 76, by reason of the manner in which it is mounted, freely permits this rocking action to take place. Upon full engagement of the shoe with the drum, the shoe is displaced a slight distance in a counterclockwise direction about the drum axis to bring its abutment face 38 into firm engagement with link 41, the coacting faces thereof freely sliding upon each other as this takes place. As previously pointed out, openings 81 and 82 in the lever plates are much larger than the diameter of the spring, with the result that the shoe and lever assembly may freely undergo relative circumferential movement. The opposite shoe (not shown) functions in exactly the same way for clockwise rotation of the drum as the illustrated shoe for counterclockwise rotation, since the levers are fulcrumed to the same side of the axis of drum rotation.

Assuming that the drum is rotated in the opposite direction, namely, clockwise as viewed in Figure 1, and the brake actuated as before, the drum reaction forces the brake shoe angularly in a clockwise direction, so as to bring surface 39 into tight engagement with abutment member 42. This transmits the braking reaction forces applied to the shoe by the drum to anchor pin 16. The effective anchor for the brake shoe has therefore been shifted or transposed, through reversal of rotation of the drum, from pin 15 to pin 16, and spring 76 freely permits any necessary tilting of the shoe on the levers to take place because it acts substantially directly through the fulcrum, and the openings in the levers are sufficiently large to permit relative movement between the spring and levers.

Upon conclusion of either of the braking operations just described, pressure is released from cylinder D and spring 72 returns the levers to the inoperative or "release" position shown in Figure 1, and the ends of the shoe 38 and 39 are brought into a stable release position against links 41 and 42, thereby arresting further retracting movement of the levers.

The geometry of this brake is the same as that disclosed in the aforementioned patent. Referring to Figure 1, (1) the actuating force P acts through the fulcrum point of member 73 substantially at the mid point of the shoe, and is directed substantially along the horizontal center line; (2) the thrust or torque reaction Q—1 or Q—2, depending upon the direction of rotation of the drum, acts at 90° to the particular anchor pin involved; and (3) the resultant drum reaction R passes through the intersection X of Q—1 and Q—2.

If after the brake has been in use for some time the lining becomes so worn that an undesirably large clearance develops between the lining and the drum, each nut 21 is loosened sufficiently to free it for rotation. The anchor pins are rotated to take up the clearance as follows: Referring to Figure 1, the axis of eccentric 19 is offset from the axis of the anchor pin, with the result that, when the pin is rotated to take up wear, abutment member 41 will be moved upwardly and to the left. Moving link member 41 as just described in effect reduces the distance between link members 41 and 42, and results in movement of the brake shoe toward the drum. Movement of the shoe as just described takes place independently of the associated lever, but since openings 81 and 82 in the lever are of greater vertical width than the diameter of the springs, member 83 may freely slide upon the lever and adjust the spring to its new position.

In Figure 4 there is disclosed a modified anchor pin assembly 15a, which may be used in lieu of anchor pin 15 in the brake mechanism just described. Pin 15a has a large flange 87 which is pulled into engagement with foundation plate 10 when nut 21 is tightened, and is also provided with a large cam 19a upon which link 41 is journalled and a pair of small cams 17a located either side of cam 19a, and upon which lever plate 51 and 52 are fulcrumed.

The modified construction effects adjustment of the shoe and lever simultaneously in a compound adjusting action in the manner disclosed in the aforementioned patent. When nut 21 is loosened and the pin is rotated to adjust the shoes for wear, abutment member 41 and the lever assembly are simultaneously displaced upwardly and to the left, by reason of both the lever and shoe abutments being mounted upon eccentric portions of the pin. However member 41 will be moved a greater distance, by reason of the greater offset of the eccentric from the pin axis. Eccentric portions 17a may also be offset in the counterclockwise direction from large eccentric portion 19a preferably by 32°, as indicated in Figure 4, for a purpose that will presently appear. Moving link member 41 as just described reduces the angular distance between links 41 and 42 as previously set forth, and also results in movement of the brake shoe toward the drum as previously described. In this form of the invention, however, simultaneous movement of the lever upwardly and slightly to the left in response to pin rotation has the effect of lengthening the mechanical connections from pin 56 to the brake shoe, with the result that rotation of the anchor pin as just described results in a compound or multiplied displacement of the brake shoe in a direction to compensate for brake wear, and is particularly advantageous when it is desired to employ thick brake linings. As this adjusting operation is being carried out, spring 76 may freely slide upon the outer walls of the openings 81 and 82 in the levers to establish a new position.

From the foregoing detailed description of the invention it is apparent that we have provided a brake having a shoe mounted for floating movement between a pair of abutments and toward and away from the brake drum, with a novel lever and retracting spring assembly, in which a compression spring, acting against the shoe and reacting against the lever along a line intersecting the axis of the fulcrum elements, maintains the parts in compression at all times and makes it possible to use a single spring for retracting the brake levers and shoes from the drum when the brake is released.

Referring now to the form of the invention illustrated in Figures 5 and 6, we have illustrated the brake mechanism of Figures 1-3, inclusive, as being mounted upon a foundation plate of modified construction which permits a greater flow of air over the parts, and is intended for heavier duty work than the one just described.

Anchor pin 15 is mounted in a supporting boss 20a of modified form having a web or skirt portion 101 which is secured, as by means of rivets 102, to a foundation plate 11a of skeletonized or spider-like form.

As seen in Figure 5, plate 11a is provided with a centrally dished portion 103, terminating in an opening 104. The axle arm 105 projects through opening 104 and has a flange 106 to which the foundation plate is secured in well known manner, as for instance by cap screws 107. Upper anchor pin 16 is secured directly to the foundation plate 11a by nut 22.

As seen in Figure 6, the spider 11a intermediate anchor pins 15 and 16 is provided with a stiffening flange 108, and is so shaped as to provide a substantial space between flange 108 and the brake drum, to allow free circulation of air over the parts and cylinder D (not shown in Figures 5 and 6) for the purpose of cooling the cylinder sufficiently to prevent boiling of the fluid or destruction of rubber seals or other parts.

In order to prevent the entrance of dirt, mud, etc., during operation we preferably provide the foundation plate with a shield or closure plate 111, which is preferably mounted in place by clamping it between foundation plate 11a and axle flange 106. The lower part of the closure plate is provided with a large opening 112 through which boss 20a loosely projects. The upper end portion of the closure plate is embossed and clamped under upper anchor pin nut 22. As seen in Figure 5, the outer periphery of closure plate 111 is spaced sufficiently from the inner face of the brake drum B' to permit free exit of air during operation. In order to augment the flow of air into the brake a plurality of louvers 113 may be provided in closure plate 111 adjacent axle flange 106.

While the construction just described will provide adequate cooling under most operating conditions met with in practice, if desired, foundation plate 11a may be unbolted from the axle; closure plate 111 removed; and the parts reassembled so as to provide a substantially completely open brake structure providing increased circulation of air around all of the parts during operation.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a brake mechanism; a pair of circumferentially spaced abutments; a brake shoe extending between said abutments with circumferentially spaced portions of said shoe in contact with said abutments and mounted for controlled floating movement in association with said abutments; a lever fulcrumed adjacent one end of said shoe; force transmitting means between said lever and said shoe; and resilient means, acting against said shoe and reacting against said lever, for constantly urging said force transmitting means into assembled relationship.

2. In a brake mechanism; a pair of circumferentially spaced abutments; a brake shoe extending between said abutments with circumferentially spaced portions of said shoe in sliding contact with said abutments and mounted for controlled floating movement in association with said abutments, a lever fulcrumed adjacent one end of said shoe, resilient means urging said lever toward brake releasing position; said lever and shoe being provided with coacting force transmitting parts intermediate their length, operable to force said shoe against the drum when the lever is rocked; and spring means, acting upon said shoe and reacting against said lever, constantly urging said shoe and lever towards each other and operable to yieldingly maintain their coacting parts in force transmitting relationship.

3. The brake mechanism defined in claim 2, wherein said spring means acts along a line substantially bisecting the effective area of said brake shoe.

4. The brake mechanism defined in claim 2, wherein said force transmitting parts and said spring means act along lines substantially bisecting the effective area of said brake shoe.

5. The brake mechanism defined in claim 2, wherein said spring means is operable to permit relative circumferential movement between said shoe and lever, while maintaining their coacting parts in force transmitting relationship.

6. In a brake mechanism; a pair of abutments mounted in circumferentially spaced relationship; a brake shoe movably mounted between said abutments and having its ends in contact with said abutments; means for adjusting said abutments relatively circumferentially to compensate for brake wear; a lever fulcrumed adjacent one end of said shoe, said lever and shoe having loosely fulcruming means for transmitting brake applying forces from said lever to said shoe; resilient means constantly urging said fulcruming means into force transmitting relationship and permitting radial movement of said shoe and lever in response to actuation of said adjusting means.

7. The brake mechanism defined in claim 6, wherein said lever is fulcrumed upon one of said abutments and said adjusting means is operable to displace said shoe and lever simultaneously toward one of said abutments at different rates of speed, and said resilient means and said fulcruming means are operable to maintain said lever and shoe in force transmitting relationship in all adjusted positions thereof.

8. In a brake mechanism; a pair of circumferentially spaced abutments; a brake shoe extending between, and having its ends coacting with, said abutments and controllably movable in association with said abutments; an actuating lever fulcrumed adjacent one end of said brake shoe and having a large area flat surface intermediate its ends; a large area curved surface intermediate the ends of said brake shoe; an element disposed in full surface engagement with said flat and curved surfaces and operable to advance said shoe toward said drum when said lever is rocked in one direction; means for rocking said lever in said one direction, means for resiliently urging said lever in the opposite direction, and spring means, acting upon said shoe and reacting against said lever, constantly urging said shoe and lever into clamping relationship with said element.

9. The brake mechanism defined in claim 8, wherein the center of curvature of said curved surface is located adjacent a line located midway between said abutments, and said spring means acts along said line.

10. The brake mechanism defined in claim 8, wherein said spring means comprises a compression spring acting directly upon a seat provided on said shoe and reacting directly against a seat provided on said lever.

11. In a brake mechanism, a brake shoe mounted for movement toward and away from a brake drum and having a web directed toward the drum axis; a pair of actuating lever members fulcrumed adjacent one end of said brake shoe and having said web guided between them; means fulcruming said brake shoe web upon said lever members; and spring means urging said lever members and shoe toward said fulcruming means, comprising a compression spring seating in openings in said web and lever members and urging said web and lever members into cooperative engagement with said fulcruming means.

12. The brake mechanism defined in claim 11, wherein the opening in said web is so dimensioned as to restrain said spring against substantial circumferential movement, and the openings in said lever members are so dimensioned as to permit substantial circumferential movement of said spring and brake shoe with respect to said lever members.

13. The brake mechanism defined in claim 11, wherein one end of said spring reacts against a bridge member seating against one wall of each opening in said lever members.

14. The brake mechanism defined in claim 11, wherein the width of the openings in said lever members materially exceeds the diameter of said spring, and one end of the latter bears against a bridge member seating against one wall of each of said lever openings, thereby permitting limited circumferential movement of said spring in said openings.

15. In a brake mechanism, a pair of circumferentially spaced abutments; a brake shoe extending between said abutments and mounted for controlled movement in association with said abutments; a lever fulcrumed adjacent one end of said shoe; force transmitting means between said lever and said shoe positively positioned relative to said shoe and slidable lengthwise of said lever; and resilient means also positively positioned relative to said shoe and slidable lengthwise of said lever, acting against said shoe and reacting against said lever, for retaining said force transmitting means under compression between said shoe and said lever.

16. A brake shoe comprising a web having an arcuate lateral flange and end abutment faces; a friction brake lining on said flange; an arcuate recess in the edge of said web opposite said flange; an aperture in said web intermediate said recess and flange; and a spring seat in a radial facing wall of said aperture.

17. A sub-assembly for use in a friction brake comprising a brake shoe having a web portion with an arcuate flange along one edge thereof and an arcuate recess in the opposite edge thereof and with end surfaces constituting abutment surfaces for said shoe, said flange having a lining of friction material on the outer surface thereof; a lever comprising a pair of plates disposed one at each side of said shoe web and a saddle bar secured between said plates opposite the recess in said web; a force transmitting element having an arcuate edge received in said recess and a straight edge resting on said saddle bar; and a compression spring disposed in registering apertures in said shoe web and said lever plates and acting to compress said element between said web and said saddle bar.

18. In a friction brake mechanism, a support; a pair of circumferentially spaced abutments on said support; a brake shoe extending between said abutments in slidable contact therewith; a lever fulcrumed adjacent one end of said brake shoe; force transmitting means shiftably mounted between said lever and shoe; and resilient means extending between said lever and shoe so as to act against one and react against the other for constantly urging said force transmitting means into operative relationship with said lever and said shoe.

19. In a friction brake mechanism, a support; a pair of circumferentially spaced abutments carried by said support; a brake shoe extending between said abutments in slidable contact therewith; a lever fulcrumed adjacent one end of said shoe; means for transmitting brake application forces from said lever to said shoe; and resilient means located substantially at the middle of said shoe acting against said shoe and reacting against said lever for constantly urging said force transmitting means into operative relationship with said lever and said shoe.

20. In a brake mechanism, a support; a pair of circumferentially spaced abutments on said support; a lever pivoted on said support; a brake shoe extending between said abutments and rockably and slidably connected to said lever for controlled floating movement in association with said abutments during brake applying movement of said lever; and resilient means interconnecting said lever and shoe for maintaining them in operative relationship during brake retractive movement of said lever.

21. In a brake mechanism, a support; a pair of circumferentially spaced abutments loosely pivoted on said support; a brake shoe having spaced abutment faces constructed and arranged to slidably engage similar faces on said abutments; a lever pivoted upon said support; force transmitting means slidably and rockably interconnecting said lever and shoe; and resilient means interconnecting said lever and shoe for maintaining operative relationship between said lever and shoe and said force transmitting means.

22. In the brake mechanism defined in claim 21, said resilient means comprising a spring shiftably mounted between said lever and shoe so as to maintain its line of action in substantial alignment with the fulcrum about which said brake shoe is rocked during operation.

23. In a brake mechanism; a support; a lever pivoted adjacent one end on said support; a pair of circumferentially spaced abutments on said support; a brake shoe extending between said abutments; an arcuate lateral brake lining flange on said brake shoe; an arcuate recess formed in the edge of said shoe opposite said flange; means providing a slide face on said lever; a force transmitting block having an arcuate face interfitting with said recess and a guide face contacting the slide face on said lever, so that said shoe is rockably and slidably mounted on said lever to adapt itself to full surface contact of said lining with a brake drum during operation; and a spring interconnecting said lever and shoe having a shiftable mounting thereon for maintaining its line of action in substantial alignment with the fulcrum about which said brake shoe rocks during operation.

24. In a brake mechanism, a support; a lever pivoted at one end on said support; a brake lining carrying shoe rockably and slidably connected to said lever; means for adjusting said shoe relative to said lever for compensating for brake lining wear; and resilient means maintaining said lever and shoe in operative relationship.

25. In a brake mechanism, a rotatably mounted anchor pin having a concentric journal portion and an eccentric journal portion; a lever pivoted upon said concentric journal portion; a brake shoe spring pressed against said lever and rockably and slidably connected to said lever; rockable abutments engaging spaced faces on said shoe, one of said abutments being pivoted on said eccentric journal portion; and means for rotating said pin about its axis whereby said shoe may be adjusted independently of said lever to compensate for brake lining wear.

26. In a brake mechanism, a pair of levers pivoted at adjacent ends and having their other ends connected by a brake actuator; a brake shoe rockably and slidably connected to each lever and resilient means interconnecting each lever and its associated shoe; and a single retractor spring means interconnecting said levers at their ends opposite said pivoted ends; said resilient means maintaining close assembly of the lever and shoe during retraction of the brake levers by said retractor spring.

HERBERT W. ALDEN.
LAWRENCE R. BUCKENDALE.
RALPH K. SUPER.